United States Patent
Kuenzi et al.

(10) Patent No.: US 8,947,200 B2
(45) Date of Patent: Feb. 3, 2015

(54) METHOD OF DISTRIBUTING STAND-ALONE LOCKS

(75) Inventors: Adam Kuenzi, Silverton, OR (US); Ron Chapin, Gervais, OR (US)

(73) Assignee: UTC Fire & Security Corporation, Farmington, MN (US)

( * ) Notice: Subject to any disclaimer, the term of this patent is extended or adjusted under 35 U.S.C. 154(b) by 178 days.

(21) Appl. No.: 13/373,534

(22) Filed: Nov. 17, 2011

(65) Prior Publication Data
US 2013/0127593 A1 May 23, 2013

(51) Int. Cl.
G05B 23/00 (2006.01)
G07C 9/00 (2006.01)

(52) U.S. Cl.
CPC ........ *G07C 9/00571* (2013.01); *G07C 9/00103* (2013.01); *G07C 9/00817* (2013.01); *G07C 2009/00825* (2013.01)
USPC ...................................................... 340/5.51

(58) Field of Classification Search
USPC ......... 340/5.51, 5.61, 5.8; 455/41.1; 380/260, 380/277
See application file for complete search history.

(56) References Cited

U.S. PATENT DOCUMENTS

| | | | | |
|---|---|---|---|---|
| 6,098,056 | A * | 8/2000 | Rusnak et al. | 705/75 |
| 6,130,621 | A * | 10/2000 | Weiss | 340/5.28 |
| 6,430,690 | B1 * | 8/2002 | Vanstone et al. | 713/182 |
| 6,718,467 | B1 * | 4/2004 | Trostle | 713/171 |
| 6,822,552 | B2 | 11/2004 | Liden et al. | |
| 7,012,503 | B2 * | 3/2006 | Nielsen | 340/5.6 |
| 7,196,610 | B2 * | 3/2007 | Straumann et al. | 340/5.61 |
| 7,321,288 | B2 * | 1/2008 | Nishimura | 340/5.2 |
| 7,389,530 | B2 * | 6/2008 | Raghunath et al. | 726/2 |
| 7,506,054 | B1 * | 3/2009 | Fuh et al. | 709/225 |
| 7,822,989 | B2 * | 10/2010 | Libin et al. | 713/182 |
| 2003/0151493 | A1 * | 8/2003 | Straumann et al. | 340/5.25 |
| 2004/0025039 | A1 | 2/2004 | Kuenzi et al. | |
| 2004/0250076 | A1 | 12/2004 | Kung | |
| 2006/0072755 | A1 * | 4/2006 | Oskari | 380/270 |
| 2006/0170533 | A1 * | 8/2006 | Chioiu et al. | 340/5.61 |

(Continued)

FOREIGN PATENT DOCUMENTS

| | | |
|---|---|---|
| WO | 2009042763 A1 | 4/2009 |
| WO | 2010039598 A2 | 4/2010 |
| WO | 2010125309 A1 | 11/2010 |

OTHER PUBLICATIONS

European Patent office Communication, Notification of Transmittal of the International Search Report and the Written Opinion of the International Searching Authority, or the Declaration from International Application No. PCT/US2012/063184 dated Feb. 5, 2013, 12 Pages.

*Primary Examiner* — Hai Phan
*Assistant Examiner* — Royit Yu
(74) *Attorney, Agent, or Firm* — Cantor Colburn LLP

(57) ABSTRACT

An authentication server for a wireless lock system comprising a wireless lock and a key device is configured to receive and authenticate a validation message. The validation message is created at the wireless lock from a secret key contained in the wireless lock. The authentication server receives the validation message from the key device, receives a certificate of ownership provided by the user, and authenticates the validation message and key device using copies each stored in a database of the authentication server. The authentication is configured to associate the user with the lock ID upon successfully authenticating the validation message, thereby enabling the authorizations server to provide the user with digital credentials to open the lock.

19 Claims, 2 Drawing Sheets

(56) References Cited

U.S. PATENT DOCUMENTS

| | | |
|---|---|---|
| 2006/0255910 A1* | 11/2006 | Fukushima et al. ......... 340/5.65 |
| 2007/0168674 A1* | 7/2007 | Nonaka et al. ............... 713/182 |
| 2007/0200665 A1* | 8/2007 | Studerus ...................... 340/5.61 |
| 2007/0222555 A1* | 9/2007 | Tengler et al. ................ 340/5.6 |
| 2008/0211624 A1* | 9/2008 | Micali et al. .................. 340/5.6 |
| 2008/0301776 A1* | 12/2008 | Weatherford ..................... 726/3 |
| 2009/0169013 A1 | 7/2009 | Fascenda et al. |
| 2010/0031714 A1 | 2/2010 | Brown et al. |
| 2010/0073129 A1* | 3/2010 | Pukari ............................ 340/5.8 |
| 2010/0237989 A1* | 9/2010 | Ikegami et al. .............. 340/5.61 |
| 2011/0035604 A1* | 2/2011 | Habraken ...................... 713/193 |
| 2013/0043973 A1* | 2/2013 | Greisen et al. .............. 340/5.51 |

\* cited by examiner

METHOD OF DISTRIBUTING STAND-ALONE LOCKS

BACKGROUND

The present invention relates generally to wireless electronic and electromechanical locks, and more particularly to methods for registering stand-alone locks by associating stand-alone lock IDs with end user accounts.

Many wireless locks operate by validating a digital credential provided by a user. In some cases this credential may be provided with the lock. More complex systems and systems with improved security, however, typically do not use static credentials, and may associate a single credential with multiple locks. In such systems, digital credentials are commonly assigned to users by an authentication system (usually operated by a lock vendor or large institution). Such systems may associate locks with individual users or with user groups, or may collectively associate groups of locks with users. Users are typically authenticated to a particular account by means of some unique identifier, such as an incoming phone number, an account ID, an account password, or some combination of such information. Authentication systems provide credentials only to users authorized to access the wireless lock.

Locks are typically programmed with user information and associated with a user account in a factory or at a trusted facility, prior to shipping to a known end user. This practice is not practical where the end user is not known when a lock is manufactured and packaged. To handle such situations, some conventional systems require users to submit a serial number via a portal, so as to associate themselves or their organization with the lock. A few such systems further utilize one-time passwords unique to each lock as means of proving ownership. Conventional methods neither prove nor require that a user have actual possession of the lock. Serial numbers can be copied, and passwords can be communicated; a lock registration method is needed which proves actual possession, and rightful purchase and ownership of the lock.

SUMMARY

The present invention is directed toward an authentication server for a wireless lock system comprising a wireless lock and a key device. The authentication server is configured to receive and authenticate a validation message. The validation message is created at the wireless lock from a certificate of ownership provided by a user, and a secret key contained in the wireless lock. The authentication server receives the validation message from the key device, and authenticates the validation message using copies of the certificate of ownership and the secret key stored in a database of the authentication server. The authentication server is configured to associate the user or user's organization with the lock ID upon successfully authenticating the validation message, thereby enabling the authorization server to provide the user with digital credentials to open the lock.

DETAILED DESCRIPTION

Figure 1:
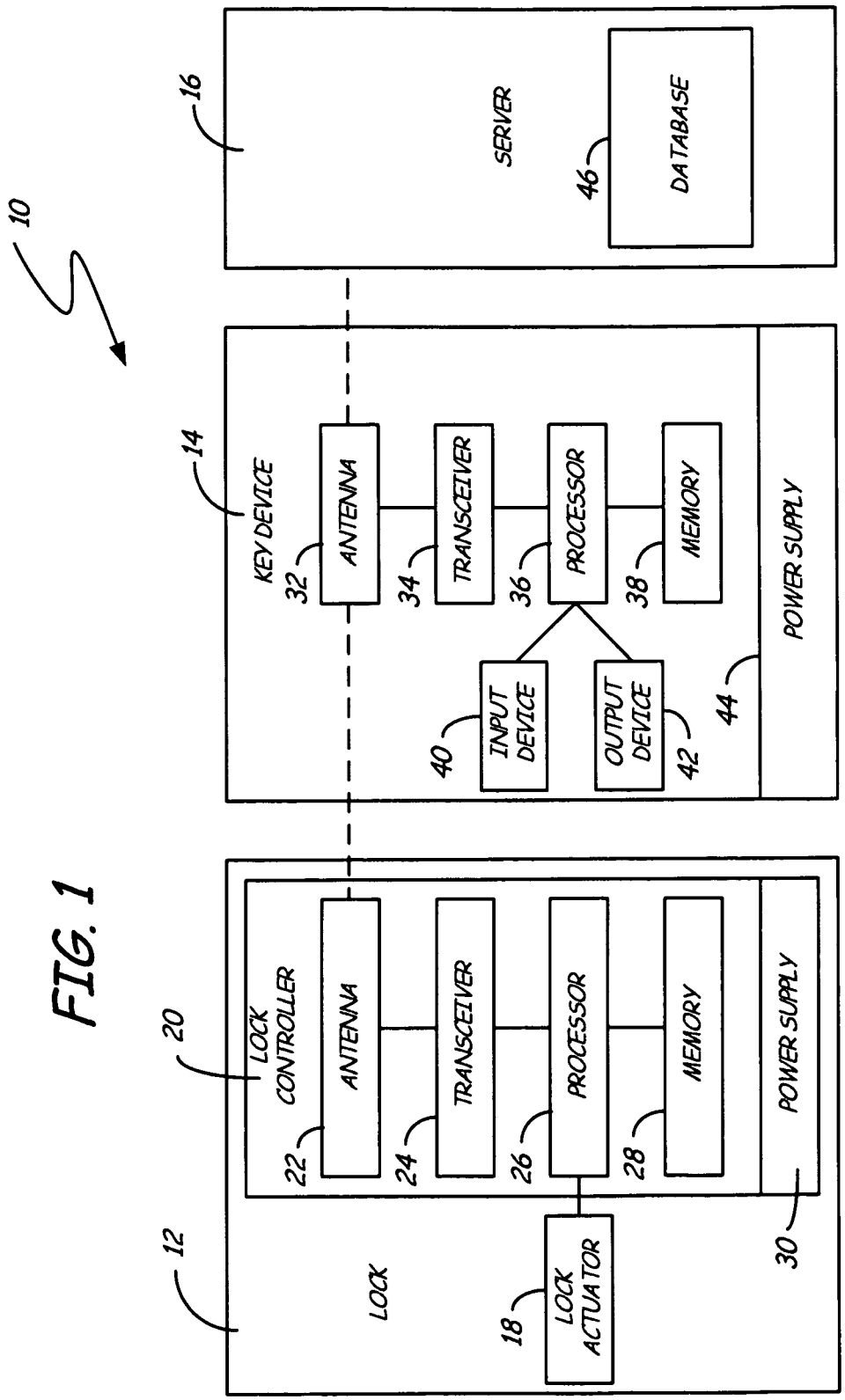
FIG. 1 is a block diagram of a wireless lock system.

FIG. 1 is a block diagram of wireless lock system 10, comprising lock 12, key device 14, and server 16. Lock 12 comprises lock actuator 18 and lock controller 20, which includes antenna 22, transceiver 24, processor 26, memory 28, and power supply 30. Key device 14 comprises antenna 32, transceiver 34, processor 36, memory 38, input device 40, output device 42, and power supply 44. Server 16 manages database 46.

Lock 12 is a lock responsive to digital credentials from key device 14, and may, by way of example, be a door lock, a replaceable lock core, a reader coupled to a door lock, or the lock of a lockbox. Lock 12 includes both lock actuator 18 and lock controller 20. Lock actuator 18 may be an electronic or electromechanical actuator which either unlocks or permits to be unlocked a physical locking structure. Lock controller 20 commands lock actuator 18 in response to instructions received from key device 14. Lock controller 20 and lock actuator 18 may be parts of a single electronic or electromechanical lock unit, or may be components sold or installed separately. Lock memory 28 is a conventional semipermanent data storage medium. Lock 12 is issued a lock ID and a secret key at manufacture, both of which are stored in lock memory 28. The lock ID uniquely identifies lock 12 to server 16, as discussed in further detail below.

Lock transceiver 24 is a conventional transceiver capable of transmitting and receiving data to and from antenna 32 of key device 14. Lock transceiver 24 may, for instance, be a near field communication (NFC) or Bluetooth, WiFi, or other conventional wireless transceiver. In some embodiments, lock transceiver may operate in a passive "tag" mode, receiving power inductively from key device 14. Lock antenna 22 is an antenna appropriate to lock transceiver 24. Lock processor 26 is a conventional data processing device such as a microprocessor. Lock power supply 30 is a power source which powers other elements of lock controller 20, and in some embodiments also powers lock actuator 18. In other embodiments, lock power supply 30 may only power lock controller 20, leaving lock actuator 18 to be powered primarily or entirely by another source, such as user work (e.g. turning a bolt). By way of example, lock power supply 30 may be a line power connection, a power scavenging system, or a battery. Alternatively, as noted above, lock power supply 30 may be a NFC power induction means incorporated into transceiver 24 and antenna 22, which receives power from key device 14 when in use.

Key device 14 is a wireless capable handheld device such as a smartphone, as explained above with respect to FIG. 1. Key transceiver 34 is a transceiver of a type corresponding to lock transceiver 24, and key antenna 32 is a corresponding antenna. Although only one key transceiver 34 and key antenna 32 are shown, key device 14 may comprise multiple transceivers and antennas of different types. Key device 14 may, for instance, use one key transceiver 34 to communicate with (and potentially power) lock 12, and another key transceiver 34 to communicate with server 16. Key processor 36 is a microprocessor or analogous logic processor which handles digital credentials, and communicates with lock processor 26 via intervening antennas and transceivers 22, 24, 32, and 34. Key memory 38 is a conventional memory array wherein digital credentials are stored. Key memory 38 may be multipurpose memory available for a variety of other tasks performed by key device 14. Key processor 36 receives user input via input device 40, and provides information to users via output device 42. Input device 40 may, for instance, be a keypad or touch screen. Output device 42 may be a display, audio speaker, or analogous output mechanism. Key power supply 44 is a power source such as a battery, which supplies power to all components of key device 14.

Server 16 is an access management server containing at least one database 46 associating lock IDs with corresponding secret keys, and with user accounts. Database 46 further associates each lock ID with a certificate of ownership used to register a user account and an unassigned lock, as explained in further detail below with respect to FIG. 2. Although server 16 is described as a single unit, a distributed network of devices may equivalently be used. While key device 14 communicates directly with lock controller 20, key device 14 may communicate with server 16 either directly or via intermediaries (not shown). Server 16 and lock 12 communicate via key device 14.

To obtain access to a region protected by lock 12, a user must provide lock controller 20 with a valid digital credential indicating that such access is permitted. This digital credential is retrieved from server 16, and is validated by lock processor 26. The digital credential may be time sensitive (i.e. valid only during certain times, or set to expire after a certain time), necessitating the eventual or periodic retrieval of updated credentials from server 16. Digital credentials may be associated with individual users, or with classes or shared accounts of users. Server 16 provides digital credentials to key device 14 only for locks 12 having lock IDs associated with a user account of the user of key device 14, in database 46. Users must therefore register a user account, and associate the lock ID of lock 12 with that account, before lock 12 is usable. In some embodiments, users registered as "owners" of a lock may subsequently be entitled to grant lock access to other users (who will not be registered as "owners"), such as other members of a common user organization.

Conventional distribution methods for wireless locks associate locks with the accounts of purchasing end-users at a factory or trusted facility. The present invention provides a method and system for quickly and securely associating lock 12 with a user account after the sale of lock 12, thereby enabling stand-alone locks to be sold without prior knowledge of the lock's eventual end-user.

Figure 2:
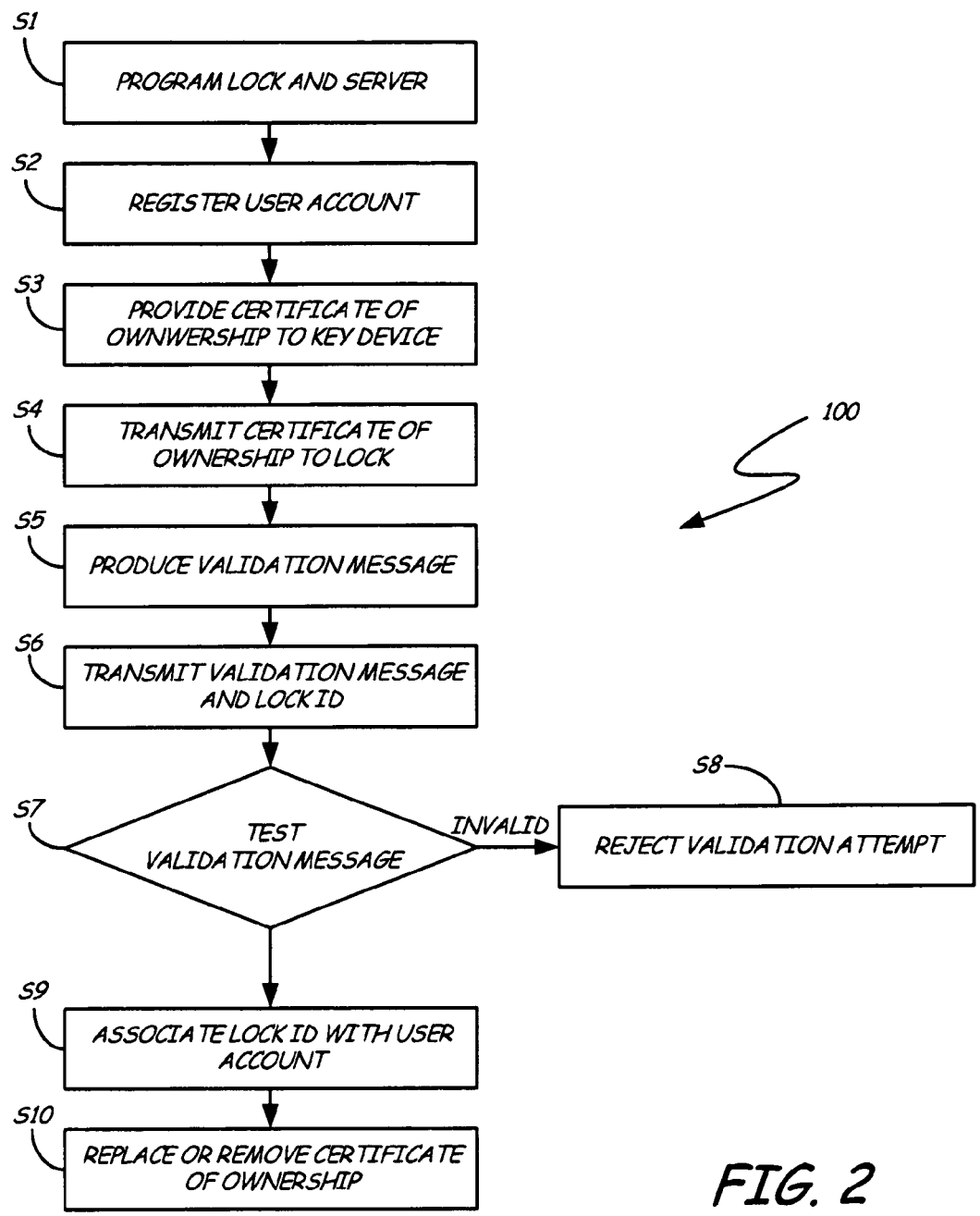
FIG. 2 is a flowchart of a method for associating a user with a lock in the wireless lock system of FIG. 1.

FIG. 2 is a flowchart of association method 100, whereby the lock ID of lock 12 is associated with a user account. First, lock 12 is programmed with a lock ID and a secret key (a string used in an encryption algorithm, as described in greater detail below) and a certificate of ownership is associated with the lock ID in database 46 of server 16. (Step S1). This process may, for instance, be performed during manufacture or packaging of lock 12 for sale. Upon purchase of lock 12, a user registers a user account with a validation service or system tracked by server 16. (Step S2). A single user account can be used with multiple locks, where appropriate. This user account may be shared by multiple users (such as multiple members of a household, or multiple business employees), or may be an individual account. User accounts may, for instance, be created via key device 14, or via a website or equivalent generic access point. Database 46 records and tracks user accounts created in this fashion.

Each lock is sold with a certificate of ownership. This certificate of ownership takes the form of a packet of information such as a string of numbers or letters, and serves as a one time password which allows the user to associate his or her user account with the lock ID of lock 12. The certificate of ownership is not stored in lock memory 28, but is provided to the user together with lock 12. The certificate of ownership may, for instance, be included in packaging materials of lock 12, or may be printed in a user manual accompanying lock 12. In other exemplary embodiments, the certificate of ownership may be included on a purchase receipt, on a removable piece attached to the lock during manufacturing, or on a label affixed to the lock. The certificate of ownership may be made available to the user in a human-enterable form, such as a printed serial number, UPC code, password, or random number. Alternatively, the certificate of ownership may be provided in a machine-readable form, such as a barcode, QR code, or image decipherable by a camera with appropriate reading software, or an embedded RFID or NFC tag readable by key device 14. The certificate of ownership may further include a checksum to allow key device 14 to verify that the certificate of ownership has been entered or read correctly.

After registering an account, the user retrieves the certificate of ownership, and submits it via input device 40 of key device 14. (Step S3). Key device 14 transmits the certificate of ownership to lock controller 20 of lock 12. (Step S4). Lock processor 26 produces a validation message from the received certificate of ownership and the secret key stored in lock memory 28 (described above with respect to FIG. 1). (Step S5). Lock processor 26 may, for instance, create a hash from the certificate of ownership and the secret key using cryptographic hash functions such as SHA-1 or SHA-2 functions. Alternatively, lock processor 26 may create a decodable encrypted block from the certificate of ownership, using the secret key. In some embodiments, the validation message may include a random portion to frustrate "guess and check" attempts to foil the validation process. Lock processor 26 transmits the validation message to key device 14 along with the lock ID of lock 12 (retrieved from lock memory 28), and key device 14 forwards the validation message and lock ID to server 16. (Step S6). The lock ID need not be encrypted.

As discussed above with respect to step S1, database 46 associates each lock ID with the corresponding certificate of ownership and secret key. Server 16 retrieves the secret key and certificate of ownership from database 46 using the lock ID, and tests the validation message using the certificate of ownership and the secret key. (Step S7). In some cases the validation message produced by lock 12 may include, or be accompanied by, a timestamp or expiration time, thereby allowing server 16 to reject validation messages which are not sufficiently recent. Where the validation message is a hash, for instance, server 16 may recreate a test hash from the secret key and certificate of ownership stored in database 46, and compare this test hash with the validation message. Where the validation message is a reversibly encrypted block, server 16 decrypts this block using the secret key, and verifies that the decrypted certificate of ownership matches its counterpart in database 46. In either case, this test will fail if either the secret key used by lock 12 or the certificate of ownership provided by the user fail to match the corresponding secret key and certificate of ownership stored in database 46. If the test fails, server 16 rejects the validation attempt, and declines to associate a user account with the lock ID. (Step S8). If the test succeeds, server 16 associates the lock ID with the user account in database 46, enabling that user account to request and receive digital certificates for lock 12 in the future. (Step S9). In some embodiments, server 16 may replace or remove the certificate of ownership from database 46 once the lock ID of lock 12 has been associated with a user, thereby preventing subsequent registration of another user once lock 12 is registered to the initial user. (Step S10). Equivalently, server 16 may simply refuse to accept validation messages for lock IDs with which a user is already associated. Server 16 may notify subsequent would-be users when lock association fails because lock 12 is already registered to prior user. In this way, the present system alerts users to the possibility that their lock certification may have been stolen, or that ownership may need to be transferred from a prior user. In particular, notification allows users to distinguish this situation from association failure due, for instance, to a secret key or certificate of ownership mismatch. In some embodiments, server 16 may facilitate a registered owner relinquishing ownership of lock 12 and generating a new certificate of ownership to facilitate transferring ownership to an unknown subsequent resale purchaser. This new certificate of ownership may be used to associate the subsequent resale purchaser with lock 12 in the same fashion described above with respect to the original owner.

In some cases a user such as an owner or manager may prefer to delegate installation and registration of lock 12 to a proxy such as an employee, locksmith, or subcontractor. Such a user may register the proxy with server 16 and provide the certificate of ownership of lock 12 to the proxy, thereby enabling the proxy to register the lock to the user's account by following the method described above with respect to FIG. 2. Alternatively, lock 12 may be configured to allow the proxy to retrieve a validation message substantially as above, but which does not contain the user's certificate of ownership (either as an encrypted message or a part of a hash) but instead contains an identifier associated with the proxy. This approach allows the user to retain control of the certificate of ownership, which must then be separately submitted to server 16 before lock 12 can be registered to the user account. In such an embodiment, the validation message may be transmitted to server 16 by the proxy, or may be sent to the user to be uploaded together with the certificate of ownership. In some cases, a proxy may provide validation messages for a plurality of locks to the user in bulk, thereby enabling the user to register many locks at once. As discussed above, the encrypted message may include or be accompanied by a timestamp or expiration time. The proxy registration methods described above enable a true owner to register lock 12 to their user account without needing to be present at lock 12 (with key device 14) during the registration process. Users may submit certificates of ownership (and encrypted messages provided by proxies, as needed) remotely, for instance via a website or other generally accessible means.

The use of both a secret key held by lock 12 and a certificate of ownership provided to the user at the time of purchase provides two security checks. The certificate of ownership provides proof of ownership, and ensures that an illegitimate possessor of lock 12 cannot register lock 12 by associating their user account with the lock ID of lock 12 at server 16. The secret key ensures that a party with illegitimate access to the certificate of ownership will not be able to register lock 12 without being in physical possession of lock 12. The user association system and method presently disclosed thus require both ownership and actual possession of lock 12. Additionally, the present invention enables stand-alone locks to be registered entirely through key device 14, without requiring that lock 12 ever communicate directly with server 16 or with any other non-local device. As a result, the presently disclosed method can be used even where lock transceiver 24 operates on extremely low power, such as when operating as a NFC tag. Furthermore, the present invention functions even when lock 12 is not capable of connecting to any device other than key device 14, and has no means of connection to server 16 (such as a wired or wireless connection to a general router).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An authentication server for a wireless lock system comprising a wireless lock and a key device, the authentication server configured to:
   receive a validation message from the key device, the validation message created at the wireless lock from a secret key contained in the wireless lock;
   receive a certificate of ownership provided by a user;
   authenticate the validation message and the certificate of ownership using copies of the certificate of ownership and the secret key stored in a database of the authentication server; and
   associate the user with the lock ID upon successfully authenticating the validation message, thereby enabling the authentication server to provide digital credentials to open the lock;
   wherein the authentication server is further configured to allow the user to identify a proxy responsible for submitting the validation message, thereby allowing the wireless lock to be associated with the user while the user is remote from the wireless lock.

2. The authentication server of claim 1, wherein the validation message is a hash of the certificate of ownership and the secret key, and wherein the authentication server authenticates the validation message by producing a test hash from the copies of the certificate of ownership and the secret key, and comparing the test hash with the validation message.

3. The authentication server of claim 1, wherein the validation message is a reversibly encrypted block containing the certificate of ownership, and wherein authenticating the validation message comprises decrypting the validation message using the copy of the secret key, and comparing the decrypted validation message with the copy of the certificate of ownership.

4. The authentication server of claim 1, wherein the validation message includes or is accompanied by a timestamp or expiration time, such that the authentication server refuses to authenticate the validation message if a predetermined time has elapsed since the creation of the validation message.

5. The authentication server of claim 1, wherein associating the user with the lock ID comprises associating a user account with the lock ID in the database of the authentication server.

6. The authentication server of claim 1, wherein the copies of the certificate of ownership and the secret key are stored in the database of the authentication server when the wireless lock is manufactured.

7. The authentication server of claim 1, wherein the authentication server is further configured to delete or alter the stored copy of the certificate of ownership upon associating the user with the lock ID.

8. A wireless lock system comprising:
   a wireless lock having a unique lock ID and a secret key, the wireless lock configured to open in response to a digital credential;
   an authentication server having a database which associates the unique lock ID with the secret key, and with a certificate of ownership not present in the wireless lock; and
   a key device configured to:
   receive a certificate of ownership from a user;
   transmit the certificate of ownership to the wireless lock;

receive a validation message and the unique lock ID from the wireless lock, the validation message formed from a combination of the certificate of ownership and the secret key;

submit the validation message and the unique lock ID to the authentication server for validation; and request the digital credential from the authentication server upon validation of the validation message by the authentication server, the authentication server testing the validation message by using the certificate of ownership in the database associated with the unique lock ID and the secret key in the database associated with the unique lock ID.

9. The wireless lock system of claim 8, wherein the authentication server is configured to associate a user account with the lock ID in the database if the validation message tests as correct.

10. The wireless lock system of claim 8, wherein the validation message includes a randomly generated portion.

11. The wireless lock system of claim 8, wherein the validation message is a reversibly encrypted using the secret key, and wherein the authentication server validates the validation message by decrypting the validation message using the secret key from the database, and comparing the decrypted validation message with the certificate of ownership in the database.

12. The wireless lock system of claim 8, wherein the user obtains the user certification of ownership from packaging or a manual of the wireless lock.

13. The wireless lock system of claim 8, wherein the wireless lock communicates with the key device via near field communication (NFC), and communicates with the authentication server only via the key device.

14. The wireless lock system of claim 13, wherein the wireless lock operates in an NFC tag mode wherein it is inductively powered by the key device, while in use.

15. The wireless lock system of claim 8, wherein the wireless lock communicates with the key device via Bluetooth, and communicates with the authentication server only via the key device.

16. A method for operating a stand-alone wireless lock having a unique lock ID, the method comprising:

receiving a user inputted certificate of ownership from a key device;

producing a validation message from the certificate of ownership and a secret key stored in the stand-alone wireless lock;

transmitting the validation message via the key device to an authentication server possessing copies of the secret key and the certificate of ownership;

the authentication server testing the validation message by using a copy of the certificate of ownership associated with the unique lock ID and a copy of the secret key associated with the unique lock ID;

receiving from the key device and validating a digital credential issued by the authentication server after authentication of the validation message by the testing; and unlocking the stand-alone wireless lock in response to the digital credential.

17. The method of claim 16, wherein the wireless lock is packaged for sale in packaging or with an attached tag or manual containing the certificate of ownership.

18. The method of claim 16, wherein the stand-alone wireless lock communicates with the key device via near field communication (NFC), and draws power from the key device inductively as an NFC tag.

19. The wireless lock system of claim 8, wherein the validation message is a function of the secret key in the lock and the certificate of ownership, the authentication server testing the validation message by applying the function to the certificate of ownership in the database associated with the unique lock ID and the secret key in the database associated with the unique lock ID to generate a reference validation message and comparing the validation message to the reference validation message.

* * * * *